United States Patent Office 3,562,985
Patented Feb. 16, 1971

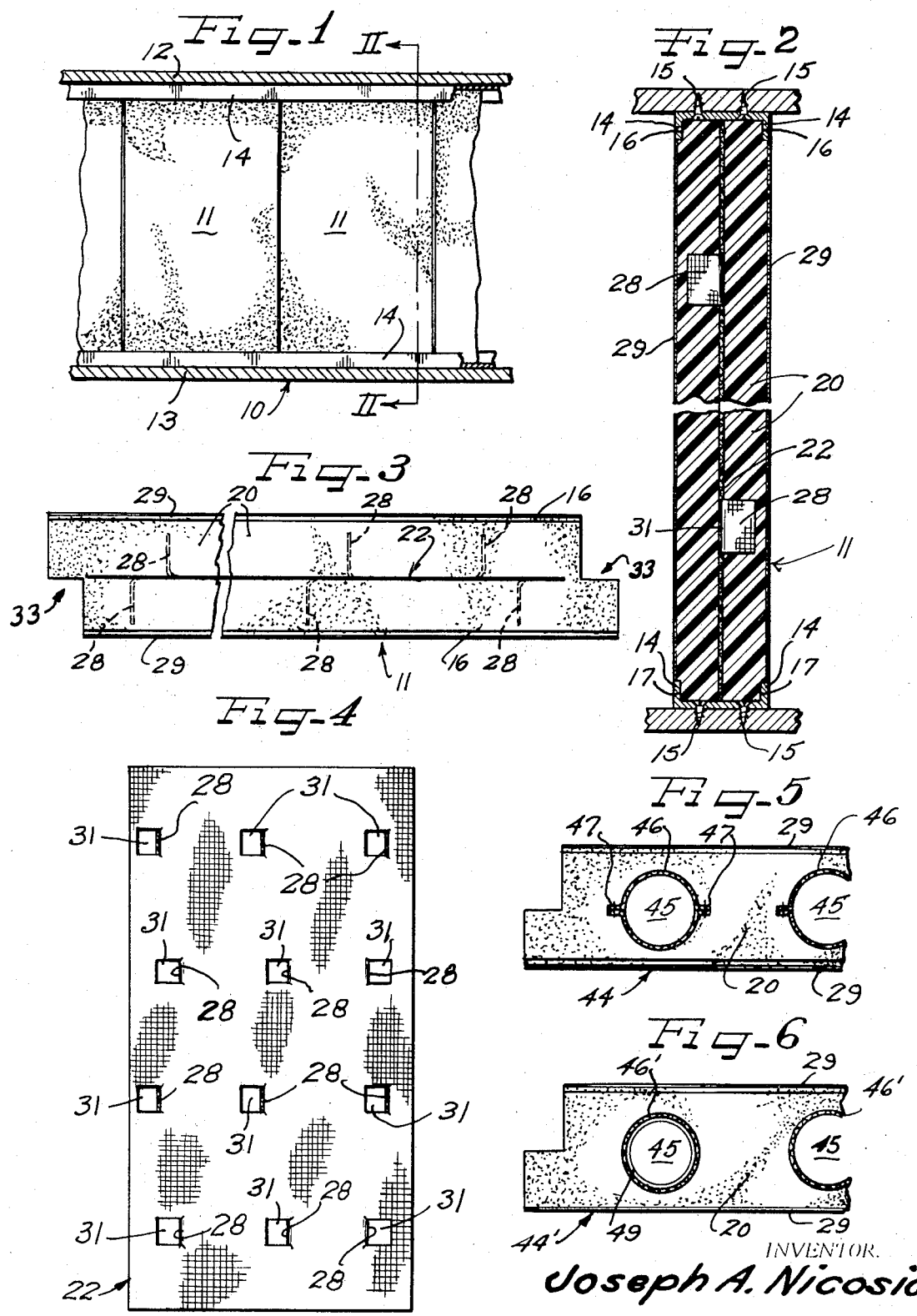

3,562,985
REINFORCED SYNTHETIC RESIN
STRUCTURAL PANELS
Joseph A. Nicosia, 819 N. Thatcher Ave.,
River Forest, Ill. 60305
Continuation of application Ser. No. 503,736, Oct. 23,
1965. This application Jan. 13, 1969, Ser. No. 793,225
Int. Cl. E04c 2/46
U.S. Cl. 52—241                                    4 Claims

ABSTRACT OF THE DISCLOSURE

A building structure comprising a plurality of interconnecting barriers, said barriers comprising a plurality of interconnecting panels, said panels comprising a rigid molded synthetic resin foam having embedded therein a plurality of longitudinally extending tubular shaped passages formed by a plurality of tubular mesh screens.

This application is a continuation of my now abandoned application Ser. No. 503,736 filed Oct. 23, 1965.

This invention generally relates to a building board or panel and the method of making the board and more particularly to a board and the method of making it of foamed synthetic resin.

Foamed synthetic resins, such as polyurethane, are known to have excellent insulating properties as well as excellent abrasion and wear resistance. These foams have been primarily used in the building field as fillers for building materials. Usually the building material, such as plywood, sandwiches the polyurethane foamed resin. This took advantage of the excellent insulating properties of polyurethane foam resin. However, the plywood was necessary because the foamed polyurethane lacked the structural strength necessary to withstand the stresses it would encompass if used as the sole building material. Therefore, the prior building manufacturers use plywood or other building material to supply the necessary structural strength to molded foam synthetic resins.

Polyurethane and other synthetic foam resins have been molded to form a wallboard. These molded foams, however, are brittle and as stated before, lack any degree of structural strength. These boards, however, are not used for example, as a curtain wall but are used mainly where strength and brittleness are not a factor—merely as a wall covering such as plasterboard.

The present invention utilizes a foamed synthetic resin building board which has the beneficial abrasion resistance properties, wear resistance properties, insulating properties of foamed synthetic resins and also has the necessary strength rigidity to withstand the stresses encountered by load bearing building boards such as curtain walls.

It is therefore an object of the present invention to provide a reinforced foamed synthetic resin building board.

Still another object of the present invention is to provide a foamed synthetic resin building board which may be used as a curtain wall of a house or similar building structure.

It is still another object of the present invention to provide a method of forming a foam polyurethane structural building board.

It is still another object of the present invention to provide a polyurethane foam reinforced building board.

Other objects, features and advantages of the present invention will be apparent from the following detailed description taken in conjunction with the accompanying figures of the drawings.

On the drawings:

FIG. 1 is an elevational front view of installed building panels constructed in accordance with the present invention;

FIG. 2 is an elevational side view taken along the lines II—II of FIG. 1;

FIG. 3 is a top plan view of the building board of FIGS. 2 and 3;

FIG. 4 is a plan elevational view of part of the panel of FIGS. 1–3;

FIGS. 5 and 6 are top plan views similar to that of FIG. 3, of two alternative constructions of the panels.

As shown on the drawings, the structural boards and panels of the present invention are made from any suitable foamed synthetic resin i.e. foamed polystyrene beads such as Pelaspan 8 and Pelaspan 18, polystyrene flakes, epoxy resin, polyurethane of the polyester and polyurethane of the polyether type. Ureafoam may also be used. The load bearing panels of the present invention are formed by conventional methods of forming and molding synthetic resins. The panels will be constructed either by batch hand pour, mechanically mixed or froth foam and will be cured by the room temperature or elevated temperature methods. The elevated temperature methods will use internal heating elements such as steam, hot oil or electrical means within the mold or the external methods with a box or batch type oven. The density of the molded foam synthetic resin board with the reinforcement embedded therein is between 1.7 to 15 pounds per cubic foot.

A preferred synthetic resin for the structural board of the present invention is polyurethane. The panel is formed by preparing an essentially homogeneous foamable mixture of polyisocyanate, an active hydrogen containing organic substance capable of forming polyurethane structure with said polyisocyanate, and a foam blowing agent. Pouring this mixture, which contains a sufficient blend for generating a resultant body of foam that will exert positive pressure on the mold surface, into the mold. Permitting foaming and curing of the blend in the mold whereby the resultant positive pressure forms a smooth-skinned article, and removing from the mold an article of smooth appearance having a foamed core structure.

For foaming and curing of the product it has been preferred to use an enclosing mold having the reinforcing means attached in place in the mold and overcharging the mold with reactant mix, i.e., there is more mix poured into the mold than would be necessary to just fill the total mold cavity with foam. The excess charge of mix results in a foam that exerts a positive pressure, that is, about 2 to 20 p.s.i., on all mold surfaces which helps produce a skin on the molded article and enhances its final appearance as discussed above. A bleeder may be used to control mold pressure.

The panel may also be produced by use of a froth foaming method whereby a gun has a mixing nozzle so that as the material may be mixed and discharged into the panel mold.

A board of the present invention is provided by taking a formable mixture of 100 parts by weight resin and 87 parts by weight of prepolymer, and vigorously agitating at 78° F. The mixture is then poured into a mold. The mold is capped and locked. After the foaming action has stopped and subsequently cured, the mold is dismantled, the plugs removed, and the finished smooth, curtain-wall panel is ready for installation.

Either the semi-prepolymer or the one-shot formulation technique is acceptable for preparing the polyurethane (polyester or polyether) foamable mixture for use in this invention. In the semi-prepolymer process the total polyisocyanate called for in the formulation is premixed with less than all of the active hydrogen-containing compound of the final product, the reaction is allowed to take place between these two components. This resulting semi-prepolymer is then vigorously blended with the remaining formulary ingredients plus the rest of the active hydrogen-containing compound to form a foamable mixture.

In the one-shot technique all the ingredients called for in the formula are initially vigorously mixed so that conversion of raw ingredients to a foamable mixture is accomplished in a single stage. With either technique a homogeneous mixture of foamable ingredients is made. Either technique dyes or pigments can be added during the processing of the raw materials. After vigorous mixing, the resulting mixture will be colored in a uniform manner in correspondence with these dyes, stains, pigments, or combination thereof. Therefore, the foamable mixtures may be the color of the formulary ingredients or that of a pigment or dye addition.

Any polyurethane foam type is suitable for the making of a board of the present invention, i.e., rigid, semi-rigid, or flexible. In this connection, organic compounds containing active hydrogen include those wherein such hydrogen content is small, resulting in minimal polymer cross-linkage and those of greater active hydrogen content. The former compounds produce flexible foams whereas the latter compounds initiate greater chain cross-linkages and can play a part in forming semi-flexible or rigid foams. Additionally, combinations of urethane group reactive hydrogens with isocyanate can be taken advantage of to give polymer cross-linking and resultant foam rigidity. Small amounts of water may be added to combine with the isocyanate group to form an amine. The amine will react with isocyanate to give a urea, which will then react in a polymer cross-linking manner with additional isocyanate to form biuret bridges. The biuret bridges add further strength to the foam structure.

The foam forming reaction can be manipulated by conventional catalysts, and the cell size of the foam may be controlled by the addition of suitable surfactants such as conventional silicone oil or polyglycol-silicone polymer. Examples of reaction catalysts include n-methylmorpholine, tetramethylbutanediamine, tri-ethylenediamine, stannous octoate, and bibutyl tin dilaurate.

Foaming of the reactants is conventionally handled by either dissolving a blowing agent in the foamable mixture or by adding water to such a mixture. In water addition, carbon dioxide for foaming will be produced by either the reaction between an isocyanate and water to form an amine or it will be produced when water reacts with the urethane linkage of a semi-prepolymer mix. If the water addition method is not employed, suitable conventional halogenated propellants such as dichlorodifluoromethane, trichloromonofluoromethane, trifluoromonochloromethane and mixtures of same may be added to the mixture for foaming.

The present invention provides the building industry with a light weight board and panel that are used to construct a house, apartment building, motels, and similar structures. The boards and panels of the instant invention may be conveniently handled and rapidly installed by relatively few workers. As a result the over-all cost of the building is drastically reduced. Reduction in cost, of course, is a major consideration in the highly competitive building industry.

The building boards of the present invention are made from reinforced foamed synthetic resin and not only reduce the cost of comparative size building but also provides building structures of longer endurance. The reinforced foamed synthetic resin board or panel has excellent strength to resist structural stresses encountered; has excellent insulating properties to reduce the cost of heating or cooling the building; has excellent wear, abrasion and weather resistance; and may easily be provided with additional materials to give it any desired beneficial properties.

Although the drawings illustrate the panels and boards of the instant invention as being used as a curtain wall, it is of course understood that these various embodiments are merely to exemplify our invention and is in no way meant to limit the boards for use as curtain walls. The boards and panels of the present invention are advantageously used also as a ceiling, flooring, outside walls, and in any manner that building boards and panels are generally used.

Referring to FIG. 1, there is shown a curtain wall generally indicated by the numeral 10. The wall 10 is composed of a plurality of reinforced foam synthetic resin wall panels 11 constructed in accordance with the present invention. The panels 11 are fastened to a ceiling support 12 and a floor support 13 by rectilinear U-brackets 14.

The U-brackets 14 are fastened to the floor and ceiling by any suitable attaching means, such as the screws 15 shown in FIG. 2. The panel 11 has laterally extending stepped top and bottom ends with steps 16 and 17, respectively. The steps 16 and 17 are formed so that panel may suit in flush contact with the U-brackets 14, and present a relatively even surface therewith.

The panel 11, as illustrated in FIGS. 2 and 3, is of a solid rather than of a hollow type construction. The panel has a network or cage comprising reinforcing screen 22 embedded in a foam synthetic resin body 20. The screens extend the entire length of the panel. Screen 22 is generally rectangular and extends around the entire perimeter of the panel and spaced approximately the same distance inward from the longitudinal surfaces of the panel.

The mesh or screen 22 is, in accordance with the invention, formed with a plurality of outstanding tabs 28. These tabs 28 are formed by cutting a generally U-shaped slit in the mesh and by folding the tab outward. The tabs are preferably made to lie in the load bearing direction and are bent to be normal to the plane of the mesh 22. As is best shown in FIG. 4, the tabs 28 are formed about the entire surface of the mesh 22 and are of such a size so as to extend toward the outer lateral surfaces 29 of the panels 11 but not to extend to or through the surfaces 29. The tabs 28 are bent in both directions so as to provide a better bind between the body 20 and the mesh 22. The bending of the tab 28 outward opens a passageway 31 which allows a better union to be formed between the two halves of the body 20 in either side of the mesh 22 and thus to protect against lateral shearing of the panel 11 at the plane of mesh 22. Such shearing might otherwise occur if the loading of the panel 11 between brackets 16 and 17 were slightly ascrewed to the line between these brackets.

A typical reinforcing screen is quarter inch wire welded steel rods having a No. 3 to a No. 7 type mesh or stucco type mesh. It is of course understood that metal wire screens are not the only type of reinforcing means that may be used.

The wall panel illustrated by FIGS. 1–3 has a thin asbestos covering 29 on the faces thereof. The asbestos covering aids in supplying fire proofing and heat resistance to the wall panel. It is fastened to the wall panel in any suitable manner i.e. bonded thereto with an adhesive molded thereto during the molding of the wall panel, and by any suitable mechanical fastening means.

It is, of course, understood that the asbestos cover is not necessary. The outer surface of the board may form the wall face. Synthetic resins are easily dyed prior to pre-forming and therefore may have a colored wall that needs no additional plastering or painting. However, if painting or plastering is desired, the foam synthetic resin has a surface which is readily adaptable for such finishing.

The panels are connected to each other by a simple step junction. Each panel 11 has a stepped longitudinal edge formed thereon as at 33. It is, of course, understood that any suitable type of connecting means may be utilized to align the boards 11 with one another.

The panel 11 may be formed by taking a properly sized section of screening and cutting a plurality of U-shaped cuts therein. These form tabs which are bent outward in both directions a distance less than one-half the thickness of the wall to be formed. This mesh is then placed in a form and one of the rigid type foamed synthetic plastic is placed therein to surround the mesh. After the foam is set the panel may be removed.

Referring to FIG. 5 there is depicted a second panel constructed in accordance with the present invention and generally indicated by the numeral 44. In this case, a plurality of longitudinally extending tubular shaped passages 45 are formed using a plurality of tubular mesh screens 46. The screen tubes 46 are formed of two semicircular (in cross-section) portions having longitudinally extending lips 47 which are joined together to form the tubular shape.

FIG. 6 depicts a modification, panel 44', of the wall 44 of FIG. 5. In this case tubes 46' are of initially round configuration rather than being formed from two sections. Also depicted in this figure is one means for forming the passageway 45. This consists of a paper tube 49 which is fitted within the tube 46' prior to the forming operation which forms the body 20 of the panel 44'. This paper tube 49 is preferably waterproof and has a diameter less than that of the mesh tube 46' to allow the foam to partly enter passage 45 and to solidify on both sides of the mesh 46'.

I claim as my invention:

1. In a building structure comprising a plurality of interconnecting barriers, said barriers comprising a plurality of adjoining structural building panels, said panels being arranged to carry compressive loading, each of said panels comprising a rigid type foam body comprised of molded synthetic resin having tow oppositely disposed exterior longitudinally extending body surfaces, a metallic reinforcing network comprising a plurality of longitudinally extending wire mesh tubes surrounding hollow passageways in said body, said tubes being embedded in said foam body extending the length of said panel and being distributed transversely throughout said panel, said reinforcing network resisting deflection resulting from compressive loading of the panel.

2. A panel for bearing a compressive load in a building comprising a closed cellular rigid body comprising a molded synthetic resin solidified foam body having longitudinally extending body surfaces, and a metallic reinforcing network comprising a plurality of longitudinally extending wire mesh tubes surrounding hollow passageways in said body, said tubes being embedded in said foam body extending the length of said panel and being distributed transversely throughout said panel.

3. The panel as claimed in claim 2 in which said mesh tube is formed from two semicircular in cross section mesh segments joined to have longitudinally extending exterior lips.

4. The panel as claimed in claim 2 in which said passageway is formed by means of a paper tube of smaller diameter than said mesh tube which is inserted in said mesh tube prior to embedding said tube in said foam.

References Cited

UNITED STATES PATENTS

| 1,915,611 | 6/1933 | Miller | 161—111X |
| 2,934,934 | 5/1960 | Berliner | 52—309X |
| 3,239,982 | 3/1966 | Nicosia | 52—309 |
| 3,298,884 | 1/1967 | Willy | 161—89X |
| 3,305,991 | 2/1967 | Weismann | 264—45X |
| 3,309,827 | 3/1967 | Nicosia | 52—309X |

ROBERT F. BURNETT, Primary Examiner

R. L. MAY, Assistant Examiner

U.S. Cl. X.R.

52—220, 309; 161—36, 139, 159, 190